No. 614,749. Patented Nov. 22, 1898.
A. PALLAS.
PNEUMATIC PLUG FOR WATER OR WASTE PIPES.
(Application filed Nov. 10, 1897.)
(No Model.)

UNITED STATES PATENT OFFICE.

ALEXANDER PALLAS, OF NEW YORK, N. Y., ASSIGNOR OF ONE-HALF TO WILLIAM F. SCHAEFER, OF SAME PLACE.

PNEUMATIC PLUG FOR WATER OR WASTE PIPES.

SPECIFICATION forming part of Letters Patent No. 614,749, dated November 22, 1898.

Application filed November 10, 1897. Serial No. 658,008. (No model.)

*To all whom it may concern:*

Be it known that I, ALEXANDER PALLAS, a citizen of the United States, residing at New York, (Brooklyn,) in the county of Kings and State of New York, have invented a certain new and useful Improvement in Pneumatic Plugs for Water or Waste Pipes, of which the following is a specification.

The object of my invention is to provide a simple, effective, and easily-adjusted plug for water or waste pipes and which is mainly intended for use in testing for leaks in the plumbing-work of a house.

In testing water-pipes for leaks it is a common practice to choke up the trap between the waste-pipe of a house and the pipe leading to the sewer by filling it with plaster-of-paris, rags, or any other material which may be at hand. The waste-pipe is then filled with water, and after the test is completed the material with which the trap is choked up is removed. This is objectionable for obvious reasons. The material employed to choke up the trap is not readily removable, and part of it is apt to be carried off into the sewer-pipe, where it is liable to remain and cause that pipe to become clogged.

My improved form of plug consists, preferably, of a rubber ball carried by a suitable stem or pipe which serves as a brace to hold the ball in position. The ball or its stem is provided with a removable tube having an automatic valve through which air is forced to expand the ball and close the pipe or trap.

In practice rubber balls of different diameters will be provided to adapt the plug for pipes and traps of various diameters, and the stem or pipe will be constructed to permit the ready substitution of one ball for another. Furthermore, the balls or the supporting stem or pipe, preferably the latter, will be provided with disks or flanges which will prevent the expansion of the ball in a direction lengthwise of the pipe to be plugged, thereby causing the ball to expand only in a direction crosswise of the pipe, and hence it will flatten out against the pipe and form an effective plug.

Figure 1:
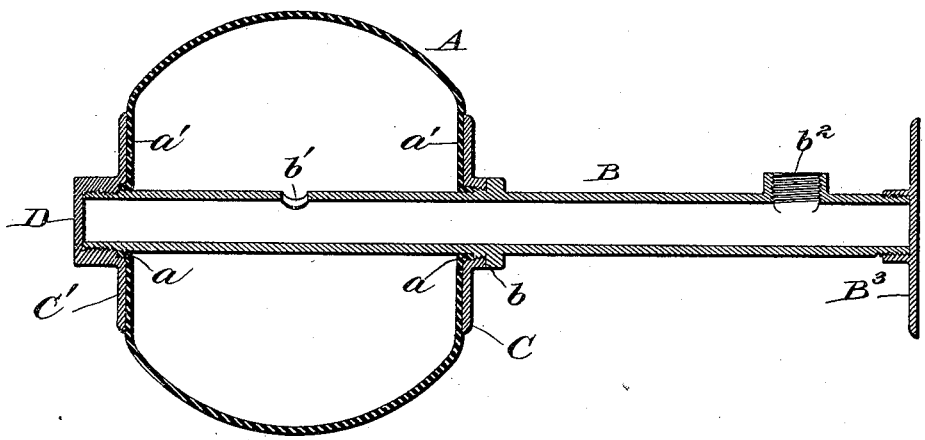
Figure 2:
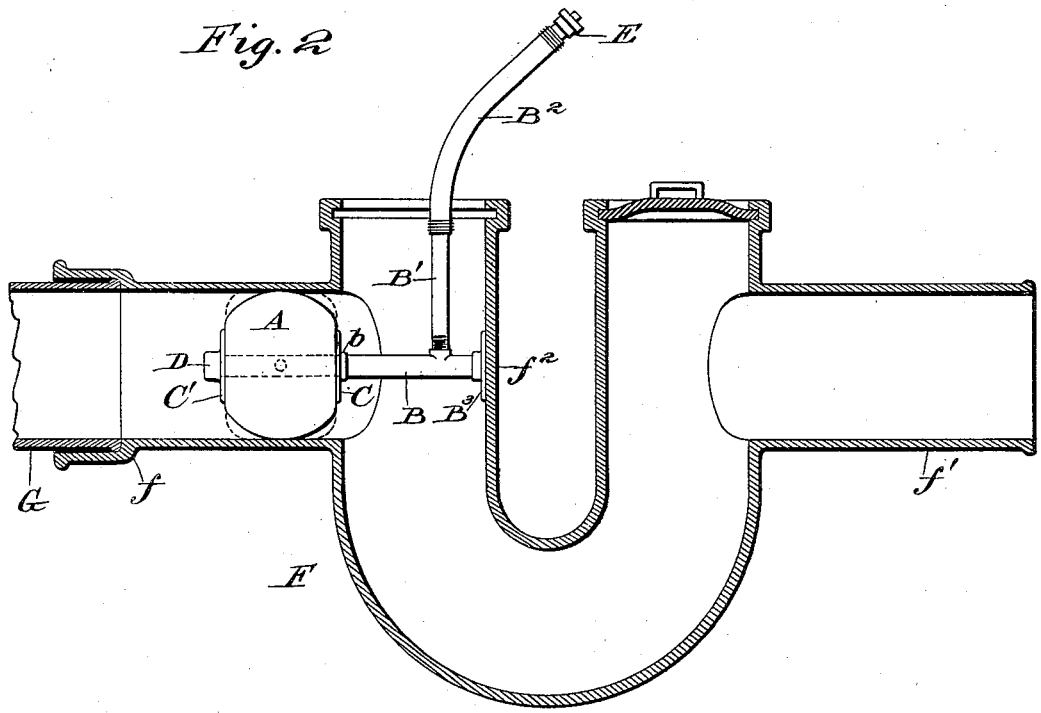

In the accompanying drawings, which illustrate my invention, Figure 1 is a central longitudinal section, and Fig. 2 is a central vertical section, of a trap, showing my improved plug in position for expansion, the dotted lines showing the shape of the ball when expanded and flattened against the pipe to be plugged.

Referring to the drawings, A is the rubber ball, having two small openings, through which the pipe B is passed. The pipe is provided with a flange or lugs $b$, against which is screwed a disk C. The ball A is placed on the pipe from the left-hand end against disk C, and the left-hand end of the pipe is screw-threaded to receive the cap D, having a flange C' formed integrally therewith and which is forced against the ball, so that the ball will flatten at the perforated sides, as shown.

As above stated, the ball may have disks attached thereto to accomplish the same purpose as disks C and C'. If desired, disk C' may be separate from cap D and held in position by the cap. It will readily be seen that when air is forced into the ball it will expand in a direction perpendicular to the supporting-pipe B, the disks C and C' preventing expansion in the direction lengthwise of the pipe. The holes in the ball through which pipe B is passed are smaller in diameter than the outside diameter of the supporting-pipe, and at both openings the ball is provided with flanges $a$, which when expanded by the pipe B will make an air-tight joint. The air under pressure in the ball will force the walls $a'$ firmly against disks C and C', and thus further prevent the escape of air from the ball. Air is forced into the ball through openings $b'$ and $b^2$ in pipe B, the former being within the ball and the latter exterior thereto and provided with an internally-screw-threaded flange to receive pipe B'. The latter pipe is preferably provided with a flexible extension $B^2$, such as a short length of rubber tubing, which is provided with any suitable form of automatic valve E. It will be understood, however, that any suitable hand-valve may be employed. To force air into the ball, the valved end of tube $B^2$ is attached to a suitable air-pump.

In Fig. 2 F indicates the usual form of U-shaped trap, having house-pipe G inserted at the coupling end $f$, and the other end $f'$ is for connection with the sewer-pipe, as well understood. The rubber ball and pipe are inserted in the trap through one of the handholes, and the right-hand end of the pipe B is set against the wall $f^2$ of the trap, whereby the plug is held in position against the pressure of the column of water in the housepipes. Pipe B is preferably provided with a flanged cap or foot $B^3$, the flange of which may be curved convex to afford a good seat against the wall $f^2$.

What I claim is—

1. A pneumatic plug for pipes having in combination an expansible ball, an inlet for the expanding fluid, means for preventing the expansion of the ball in one direction, and means for holding the plug in position against the pressure within the pipe, substantially as and for the purpose set forth.

2. A pneumatic plug for pipes having in combination an expansible ball, a pipe passing through the ball, and having an inlet within the ball for the expanding fluid, and means on said pipe for preventing the expansion of the ball in one direction, substantially as and for the purpose set forth.

3. A pneumatic plug for pipes having in combination an expansible ball, a pipe passing through the ball and having an inlet within the ball for the expanding fluid, and stationary disks on said pipe between which the ball is held and whereby the ball is caused to expand only in the direction of the diameter of the pipe, substantially as set forth.

4. A pneumatic plug for pipes having in combination an expansible ball, a pipe passing through the ball and having an inlet within the ball for the expanding fluid, means on said pipe for preventing the expansion of the ball in one direction, and means for holding the plug in position against the pressure within the pipe, substantially as and for the purpose set forth.

5. A device of the character herein described for plugging pipes, &c., having in combination an expansible ball, a pipe passing through the ball and perforated within the ball, means on said pipe for preventing expansion of the ball in one direction, and an air-supply pipe adapted to be connected with said pipe and provided with a valve, substantially as set forth.

6. A device of the character herein described for plugging pipes, &c., having in combination an expansible ball, a pipe passing through the ball and perforated within the ball, disks on said pipe for preventing expansion of the ball in one direction, and an air-supply pipe adapted to be connected with said pipe and provided with a valve, substantially as set forth.

7. A device of the character herein described for plugging pipes, &c., having in combination a ball A carried by pipe B, which is perforated within the ball, disks C and C' on said pipes for preventing expansion of the ball lengthwise of pipe B, an air-supply pipe adapted to be coupled to said pipe, a valve for said air-supply pipe, and a foot $B^3$ on said pipe B, substantially as set forth.

This specification signed and witnessed this 8th day of November, 1897.

ALEXANDER PALLAS.

Witnesses;
 W. PELZER,
 EUGENE CONRAN.